(12) United States Patent
Thielo et al.

(10) Patent No.: US 9,189,058 B2
(45) Date of Patent: Nov. 17, 2015

(54) POWER CONSUMPTION CONTROL ON AN IDENTIFIED UNUSED STORAGE UNIT

(71) Applicant: FUJITSU LIMITED, Kawasaki-shi, Kanagawa (JP)

(72) Inventors: Omar Hame Thielo, Kawasaki (JP); Yuichi Sakagami, Sagamihara (JP); Yukihiro Yoshiya, Yokohama (JP); Atsuhiro Otaka, Kawasaki (JP); Kazuma Takatsu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 264 days.

(21) Appl. No.: 13/895,592

(22) Filed: May 16, 2013

(65) Prior Publication Data

US 2013/0346782 A1    Dec. 26, 2013

(30) Foreign Application Priority Data

Jun. 20, 2012 (JP) ................. 2012-138580

(51) Int. Cl.
*G06F 1/32* (2006.01)
*G06F 3/06* (2006.01)

(52) U.S. Cl.
CPC ............ *G06F 1/3287* (2013.01); *G06F 1/3221* (2013.01); *G06F 1/3268* (2013.01); *G06F 3/0625* (2013.01); *G06F 3/0631* (2013.01); *G06F 3/0689* (2013.01); *Y02B 60/1246* (2013.01); *Y02B 60/1282* (2013.01); *Y02B 60/32* (2013.01)

(58) Field of Classification Search
CPC .................................... G06F 1/3203

USPC .......................................... 713/324
See application file for complete search history.

(56) References Cited

U.S. PATENT DOCUMENTS

| | | | |
|---|---|---|---|
| 7,573,715 B2* | 8/2009 | Mojaver et al. ............... | 361/716 |
| 7,856,526 B2* | 12/2010 | Shibayama et al. .......... | 711/112 |
| 8,001,343 B2* | 8/2011 | Kassai .......................... | 711/162 |
| 8,136,116 B2* | 3/2012 | Hosouchi et al. ............. | 718/104 |
| 8,656,099 B2* | 2/2014 | Saito et al. .................... | 711/114 |
| 2007/0079156 A1* | 4/2007 | Fujimoto ...................... | 713/300 |
| 2007/0208921 A1* | 9/2007 | Hosouchi et al. ............. | 711/170 |
| 2007/0220316 A1* | 9/2007 | Guha et al. ........................ | 714/6 |
| 2008/0080131 A1 | 4/2008 | Hori et al. | |
| 2008/0168223 A1* | 7/2008 | Reeves et al. ................. | 711/114 |
| 2008/0229131 A1* | 9/2008 | Kono et al. ................... | 713/323 |
| 2008/0266698 A1 | 10/2008 | Shibayama et al. | |

FOREIGN PATENT DOCUMENTS

JP   2008-90352    4/2008
JP   2008-276341   11/2008

* cited by examiner

*Primary Examiner* — Suresh Suryawanshi
(74) *Attorney, Agent, or Firm* — Staas & Halsey LLP

(57) ABSTRACT

A storage system that functions as one or more logical volumes includes a control unit and a plurality of storage units connected to the control unit, wherein the control unit includes a memory that stores allocation status information that indicates status of allocation of the plurality of storage units to a logical volume; an access request responding unit that controls at least one storage unit among the plurality of storage units in response to a request for access to each logical volume from a host device; and a power saving controller that identifies an unused storage unit not allocated to any logical volume among the plurality of storage units on the basis of the allocation status information and performs power saving control on the identified unused storage unit.

6 Claims, 10 Drawing Sheets

POWER CONSUMPTION CONTROL ON AN IDENTIFIED UNUSED STORAGE UNIT

CROSS-REFERENCE TO RELATED APPLICATION

This application is based upon and claims the benefit of priority of the prior Japanese Patent Application No. 2012-138580, filed on Jun. 20, 2012, the entire contents of which are incorporated herein by reference.

FIELD

The embodiments discussed herein are related to a storage system and a power consumption control method for the storage system.

BACKGROUND

There is a storage apparatus configured as illustrated in FIG. 1. A base device 110 in this storage apparatus is connected to the host via a fiber channel or the like and functions even alone (i.e., with no add-on devices 120 connected thereto) as a storage. The add-on devices 120 have a plurality of disk drives incorporated therein and are daisy-chained to the base device 110 to implement a large-capacity storage system.

The total storage capacity of this storage apparatus may be increased, therefore, by adding add-on devices 120. When installing this storage apparatus in a large-scale data center or the like, the maximum number of add-on devices 120 are sometimes incorporated in the storage apparatus such that add-on devices 120 does not have to be installed in the future.

In such a case, the add-on devices 120 that are incorporated in the storage apparatus for future extension of the storage capacity and are currently not used at all (referred to hereinafter as extra add-on devices 120) consume electric power. It is desirable, therefore, to reduce the power consumption by the extra add-on devices 120, but, in conventional storage apparatus, there is no way but to manually turn off the power switches of the add-on devices 120 to reduce the power consumption by the extra add-on devices 120.

Japanese Laid-open Patent Publication Nos. 2008-90352 and 2008-276341 discuss the power consumption control for a storage apparatus (system).

Problems to be solved by the disclosed technology are to provide a storage system that automatically controls the power consumption by the extra storage units in the storage system and to provide a power consumption control method for the storage system to automatically control the power consumption by the extra storage units in the storage system.

SUMMARY

According to an aspect of the embodiments, a storage system that functions as one or more logical volumes includes a control unit and a plurality of storage units connected to the control unit, wherein the control unit includes a memory that stores allocation status information that indicates status of allocation of the plurality of storage units to a logical volume; an access request responding unit that controls at least one storage unit among the plurality of storage units in response to a request for access to each logical volume from a host device; and a power saving controller that identifies an unused storage unit not allocated to any logical volume among the plurality of storage units on the basis of the allocation status information and performs power saving control on the identified unused storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Several embodiments are described in detail with reference to the drawings.

First Embodiment

Figure 1:
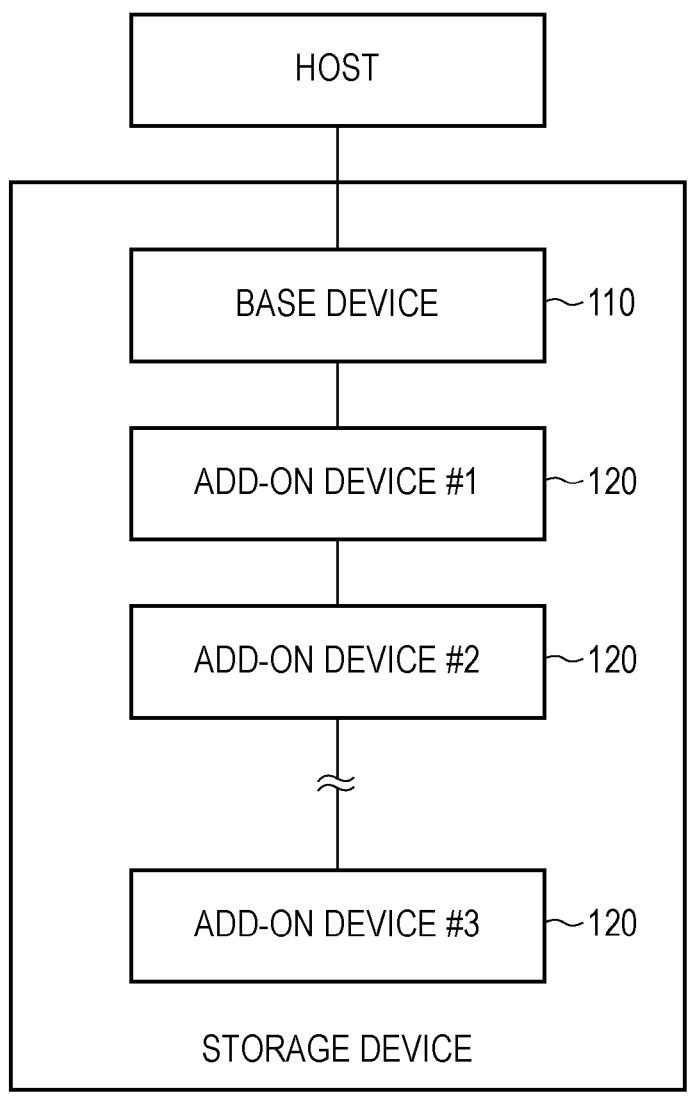
FIG. 1 is a schematic structural diagram of an existing storage system.
Figure 2:
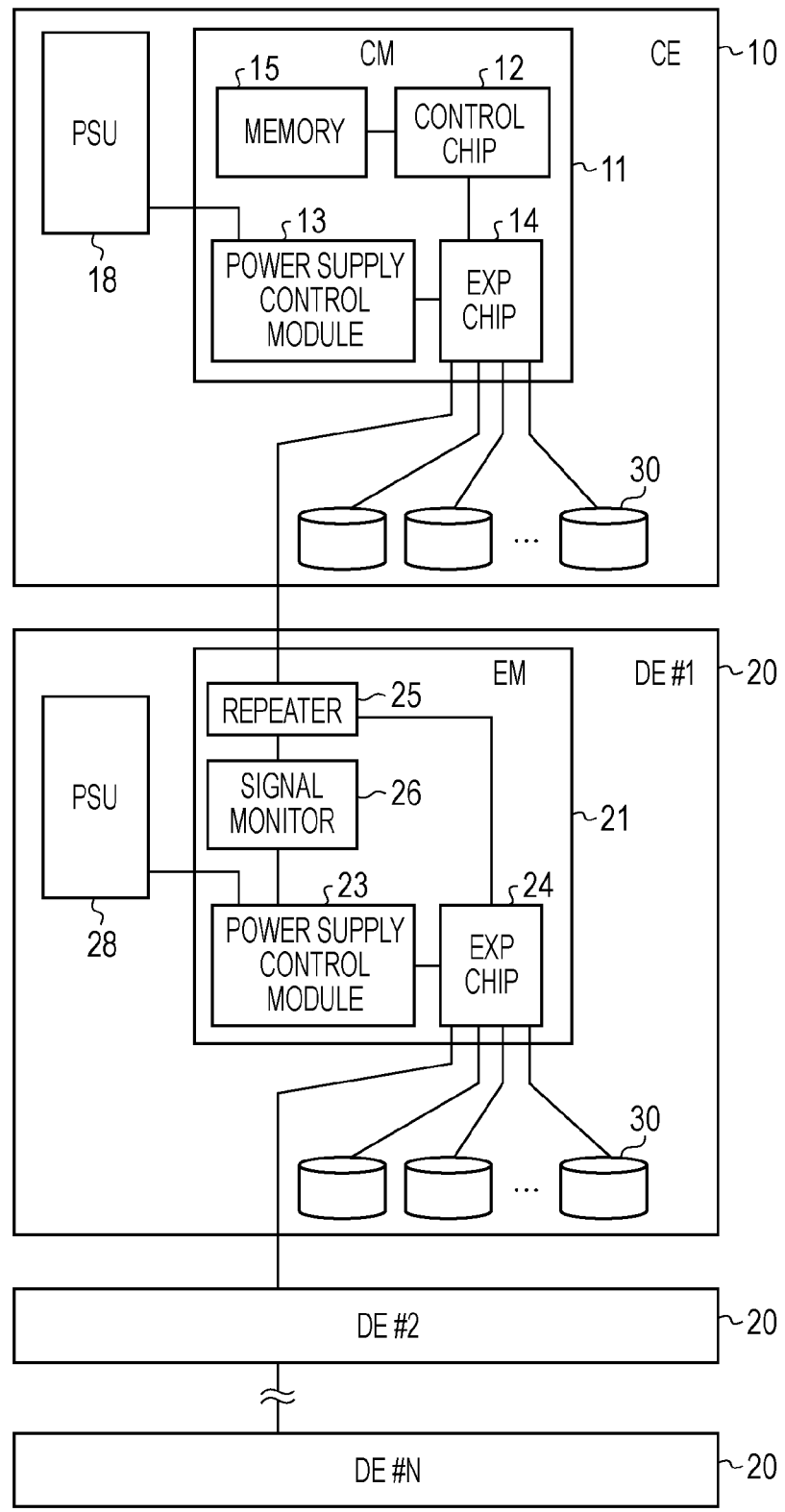
FIG. 2 is a schematic structural diagram of a storage system according to a first embodiment.

FIG. 2 illustrates the structure of a storage system according to a first embodiment. Referring first to FIG. 2, the storage system according to the present embodiment is outlined focusing on the hardware configuration thereof.

As illustrated in FIG. 2, the storage system according to the present embodiment has a controller enclosure (CE) 10 that includes a power supply unit (PSU) 18, controller module (CM) 11, and a plurality of disk drives 30. The storage system also has N drive enclosures (DE) 20 that each includes a power supply unit (PSU) 28, an expander module (EM) 21, and a plurality of disk drives 30.

PSU 28 in DE 20 is a unit that converts AC power to DC power and supplies the converted DC power to the units in DE 20. PSU 28 has a built-in fan to cool the disk drives 30 (also referred to hereinafter as disks 30) etc. in DE 20. PSU 28 is equipped with a plurality of output terminals that output DC power (such as output terminals that supply electric power to the disks 30, an output terminal that supplies electric power to an expander chip (EXP chip) 24, and output terminals that supply electric power to the units in EM 21 other than the EXP chip 24). PSU 28 enables the turning on and off of the fan and the turning on and off of the output from each output terminal to be controlled from outside.

EM 21 is a module that basically performs control operations on the disks 30 in the current DE 20 in response to the commands from CM 11 addressed to the current DE 20 and sends the other commands to the subsequent DE 20.

As illustrated in FIG. 2, EM 21 includes a power supply control module 23, an expander chip (EXP chip) 24, a repeater 25, and a signal monitor 26.

The power supply control module 23 is a unit (field-programmable gate array (FPGA) in the present embodiment) that controls PSU 28 to place DE 20 in one of the following three modes.

—Normal mode in which electric power is supplied to all the units in DE 20; —first power saving mode in which electric power is supplied to the units in EM 21 but not to the disks 30, and the fan in PSU 28 is stopped; and —second power saving mode in which electric power is supplied to the power supply control module 23, repeater 25, and signal monitor 26 but not to the EXP chip 24 and the disks 30, and the fan in PSU 28 is stopped.

More specifically, the power supply control module 23 operates as follows.

Upon start-up of the storage system, the power supply control module 23 controls PSU 28 to place DE 20 in the second power saving mode. Receiving a request for transition to normal mode with a predetermined content from the signal monitor 26, the power supply control module 23 controls PSU 28 to place DE 20 in the normal mode. Receiving a request for transition to first power saving mode with a predetermined content from the EXP chip 24, the power supply control module 23 controls PSU 28 to place DE 20 in the first power saving mode. Receiving a request for transition to second power saving mode with a predetermined content from the EXP chip 24, the power supply control module 23 controls PSU 28 to place DE 20 in the second power saving mode.

The repeater 25 is a unit (a chip having an amplification function) that relays the signals to be transmitted between the EXP chip 24 in the current EM 21 and the EXP chip 14 or 24 in the preceding enclosure (CE 10 or DE 20).

The signal monitor 26 is a unit (FPGA in the present embodiment) that detects COMINIT and COMWAKE out of the signals received by the repeater 25 from the preceding enclosure and, when detecting either one of these signals, sends a request for return to normal mode to the power supply control module 23. Both COMINIT and COMWAKE are signals used in the out-of-band (OOB) sequence.

The EXP chip 24 is a SAS expander chip that connects between the EXP chip 14 or 24 in the preceding enclosure and the EXP chip 24 in the subsequent DE 20 or each drive 30 in the current DE 20.

When activated by the electric power supplied from PSU 28, this EXP chip 24 inquires the signal monitor 26 which of COMINIT or COMWAKE has been received to cause the signal monitor 26 to send the request for return to normal mode. If COMINIT has caused the signal monitor 26 to send the request for return to normal mode, the EXP chip 24 initiates an OOB sequence to the subsequent DE 20 (EM 21).

Like PSU 28, PSU 18 in CE 10 is a unit that is equipped with a fan that cools the disk drives 30 etc. and a plurality of output terminals that output DC power and enables the turning on and off of the fan and the turning on and off of the output from each output terminal to be controlled from outside.

CM 11 is a module that receives a request for access to each logical volume from the host (not illustrated) and controls operations (read/write access) to each logical volume in accordance with the content of the received access request.

Term "logical volume" refers here to a group of disks 30 in the storage system that may be handled as a single storage device by the host. The setting (registration or cancellation) of a logical volume in the storage system is usually performed by operating a computer connected to CE 10 via a local area network (LAN). The present storage system allows the disks 30 in the system to be managed as several RAID groups and several logical volumes to be set in each RAID group.

As illustrated in FIG. 2, CM 11 includes a control chip 12, a power supply control module 13, and an expander chip (EXP chip) 14. CM 11 also has a memory 15, which includes a flash read only memory (ROM) having a firmware stored therein and a random access memory (RAM), an interface circuit (not illustrated) that connects to the host via a fiber channel or the like, a LAN port (not illustrated), etc.

The control chip 12 in CM 11 is a processor that executes the firmware stored in the memory 15 and the programs stored in a specific disk 30 (disk 30 used as the system disk) in CE 10. When activated, the control chip 12 (a program executed by the control chip 12) initiates an OOB sequence to the subsequent DE 20 (i.e., initiates a process to exchange signals for the OOB sequence using the EXP chip 14).

The EXP chip 14 is a SAS expander chip that connects between the control chip 12 and the other units (i.e., power supply control module 13 and each drive 30 in CM 11 and the subsequent DE 20).

The power supply control module 13 is a module (FPGA in the present embodiment) that performs control operations on PSU 18 as instructed by the control chip 12 (i.e., controls the turning on and off of the fan and the turning on and off of the output from each output terminal). Upon start-up of the storage system, the power supply control module 13 controls PSU 18 to place CE 10 in a mode in which electric power is supplied to the units in CE 10.

The operations described above are described more specifically. In the following description, DE #M refers to the DE 20 connected to CE 10 via M−1 DEs 20.

As is clear from the above description of the function of each unit, upon start-up of the storage system, each unit in the storage system operates as follows.

Upon start-up of the storage system, PSU 18 in CE 10 starts supplying electric power to the units in CE 10. PSU 28 in each DE 20 starts supplying electric power to the power supply control module 23, repeater 25, and signal monitor 26 in the DE 20 and thereby places the DE 20 in the second power saving mode.

Supplied with electric power, the control chip 12 in CE 10 starts operating and initiates an OOB sequence. A COMINIT signal is accordingly input to the repeater 25 in DE #1. Upon detecting the COMINIT signal, the signal monitor 26 in DE #1 outputs a request for transition to normal mode to the power supply control module 23 to cause DE #1 to transition to the normal mode.

When activated by the electric power supplied by PSU 28, the EXP chip 24 in DE #1 inquires the signal monitor 26 which of COMINIT or COMWAKE has been received to cause the signal monitor 26 to send the request for return to normal mode. In this case, COMINIT has caused the signal monitor 26 to send the request for return to normal mode, so the EXP chip 24 initiates an OOB sequence to the subsequent DE #2.

Since a similar process takes place in DE #3 and subsequent DEs 20, all the DEs 20 are placed in the normal mode (referred to hereinafter as an initial state) upon start-up of the storage system.

Next, operations of the storage system after the initial state is established are described.

Figure 3:
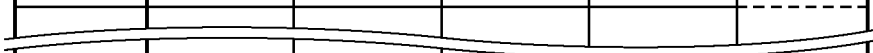
FIG. 3 illustrates logical volume setting status information.

Once the OOB sequence is completed, CM 11 (the control chip 12 in CM 11) waits for a prescribed time period (e.g., 30 minutes) to elapse. While waiting for the prescribed time period to elapse, if a logical module and/or hot spare is set, CM 11 stores in the memory 15 these settings, such as a logical module setting status in each DE 20, as the logical module setting status information arranged in the order of DEs 20 as illustrated in FIG. 3, for example. Term "hot spare" ("HS" in FIG. 3) refers to a disk being in a hot standby state as a replacement for a failed disk.

Figure 4:
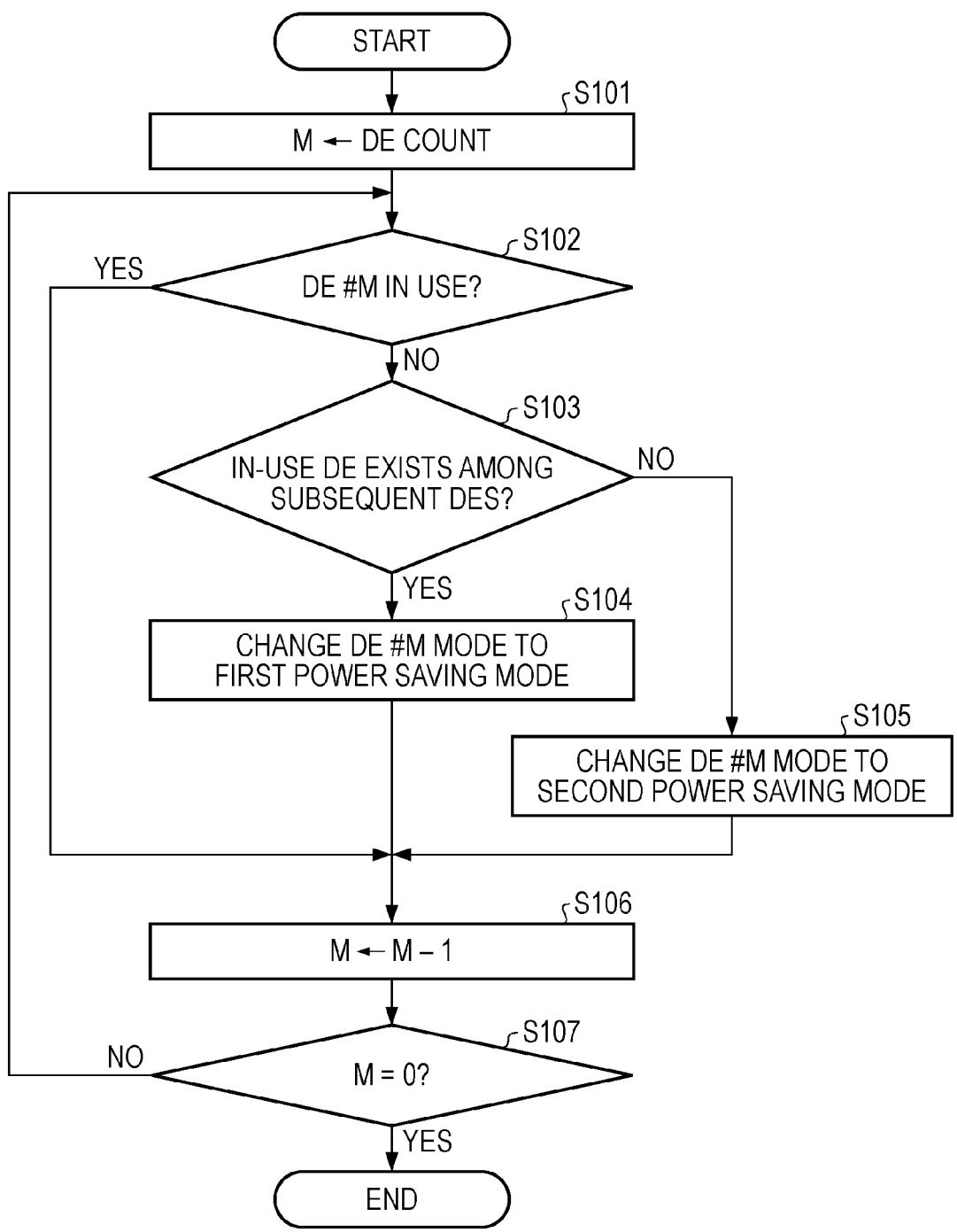
FIG. 4 is a flowchart illustrating a power saving control process performed by CM in the storage system according to the first embodiment.

Once the prescribed time period elapses, CM 11 performs a power saving control process following the procedure illustrated in FIG. 4.

More specifically, once the prescribed time period elapses, CM 11 having initiated this power saving control process sets a variable M to the number of DEs 20 in the current system (referred to hereinafter as the DE count) (operation S101).

CM 11 then determines whether DE #M is in use or not on the basis of the logical module setting status information (FIG. 3) (operation S102). More specifically, when no disk 30 in DE #M is set as an element of the logical volume or hot spare (referred to hereinafter as a logical volume etc.), CM 11 determines that DE #M is not in use in operation S102. When at least one disk 30 in DE #M is set as a logical volume etc., CM 11 determines that DE #M is in use.

When DE #M is not in use (operation S102; NO), CM 11 determines whether or not one or more in-use DEs (DEs determined to be in use in operation S102) are present among the DEs behind DE #M (referred to hereinafter as subsequent DEs) (operation S103). In other words, CM 11 determines whether or not one or more in-use DEs are present among the subsequent DEs on which the decision in operation S102 has been made.

If no in-use DEs are found among the subsequent DEs (operation S103; NO), CM 11 places DE #M in the second power saving mode by instructing DE #M to effect a transition to the second power saving mode (operation S105). If one or more in-use DEs are present among the subsequent DEs (operation S103; YES), CM 11 places DE #M in the first power saving mode by instructing DE #M to effect a transition to the first power saving mode (operation S104). Phrase "instructing DE #M to effect a transition to the I-th (I=1 or 2) power saving mode" means that "a request is sent to DE #M to cause the EXP chip 24 in DE #M to send a request for transition to the I-th power saving mode to the power supply control module 23".

In the second power saving mode, electric power is less consumed than in the first power saving mode. From the viewpoint of power consumption, it is desirable that the DEs 20 in which the disks 30 do not have to be supplied with electric power are placed in the second power saving mode. In the present storage system, however, no communication is established between a DE #X and CE 10 when the EXP chip 24 is not operating in any one of the DEs 20 between DE #X and CE 10. For this reason, when at least one in-use DE (DE 20 with which CE 10 has to establish communication) is present among the subsequent DEs, DE #M transitions to the first power saving mode, not to the second power saving mode.

After processing in operation S104 or S105, CM 11 decrements the M value by "1" (operation S106). When DE #M is in use (operation S102; YES), CM 11 decrements the M value by "1" without processing in operations S103 etc. (operation S106).

When the decremented M value is not "0" (operation S107; NO), CM 11 returns to operation S102 and repeats processing.

CM 11 repeats processing in operations S102 to S106 until the M value reaches "0". When the M value reaches "0" (operation S107; YES), CM 11 completes this power saving control process.

After completing the power saving control process, CM 11 enters a state in which CM 11 monitors the reception of an access request from the host, addition of a DE 20 (connection of a new DE 20 to the trailing-end DE 20), change of settings related to the logical volume and/or hot spare, etc.

Receiving an access request from the host, CM 11 controls several disks 30 in the system in response to the access request.

Figure 5:
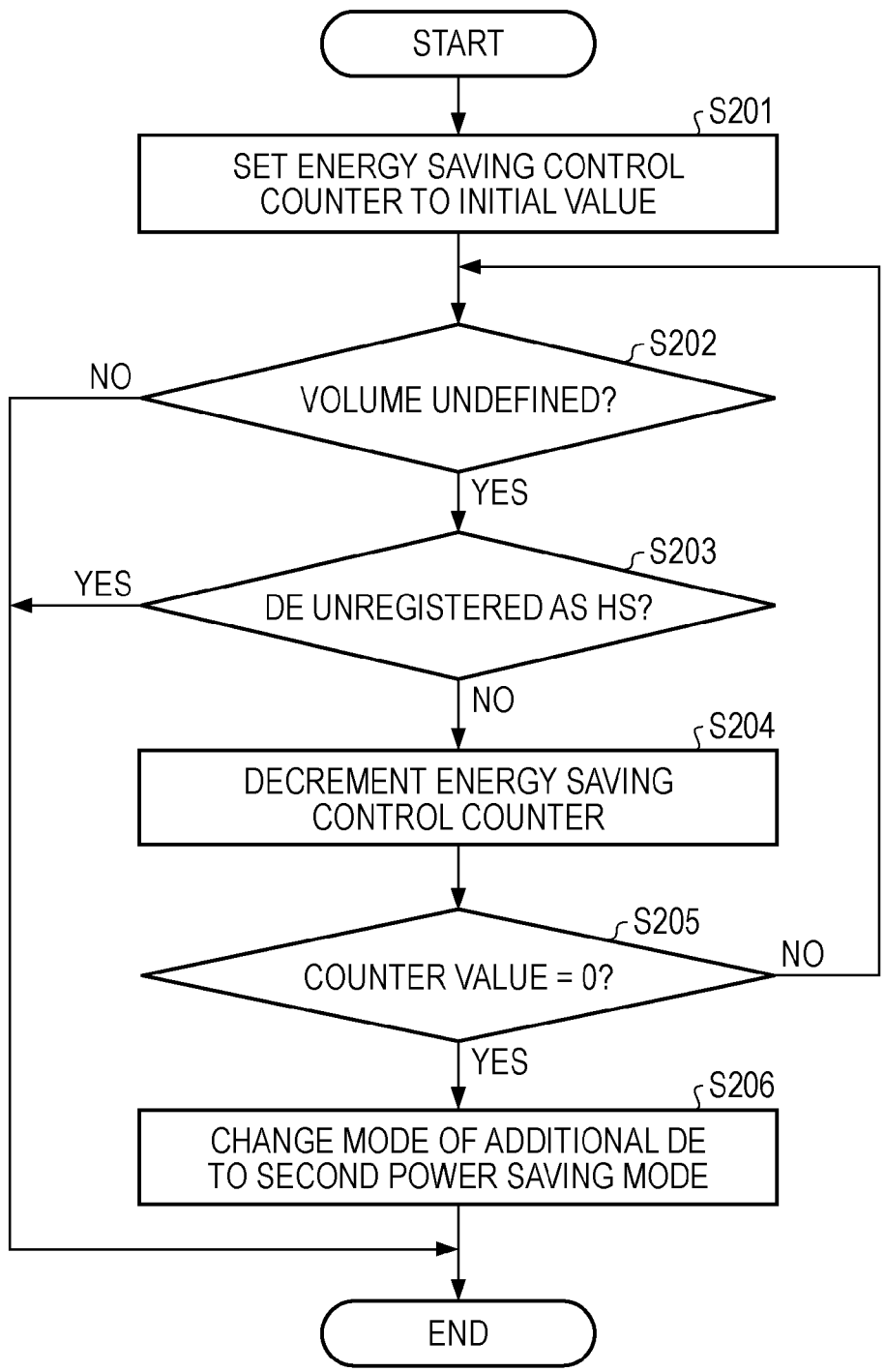
FIG. 5 is a flowchart illustrating a power saving control process for an additional DE performed by CM in the storage system according to the first embodiment.

When a DE 20 is added, CM 11 initiates a power saving control process for the added DE following the procedure illustrated in FIG. 5. More specifically, when a DE 20 (referred to hereinafter as the additional DE) is added, CM 11 first sets an energy saving control counter to an initial value (e.g., "1800") (operation S201). The energy saving control counter is a variable the value of which is stored in the RAM in the memory 15.

Then, during the predetermined time period, CM 11 monitors whether or not one or more disks 30 in the additional DE are set as elements of the logical volume, etc. (operations S202 to S205). More specifically, CM 11 performs a "process in which CM 11 determines whether or not one or more disks 30 in the additional DE are set as elements of the logical volume etc. on the basis of the logical module setting status information and, when no disk 30 is set as an element of the logical volume etc., decrements the energy saving control counter by "1", and then CM 11 determines whether or not the counter value reaches "0"" at intervals of a predetermined number of seconds (e.g., 1 second).

When one or more disks 30 in the additional DE are set as elements of the logical volume etc. (operation S202; NO/operation S203; YES) before the predetermined time period (e.g., time period depending on the initial value of the energy saving control counter) elapses, CM 11 terminates the power saving control process for the additional DE without changing the mode of the additional DE. When no disk 30 in the additional DE is set as an element of the logical volume etc. before the predetermined time period elapses (operation S205; YES), CM 11 changes the mode of the additional DE to the second power saving mode by instructing the additional DE to effect a transition to the second power saving mode (operation S206). Then, CM 11 completes the power saving control process for the additional DE.

Operations performed by CM 11 after the setting for logical module and/or hot spare is changed (registration or cancellation) are described.

Figure 6:
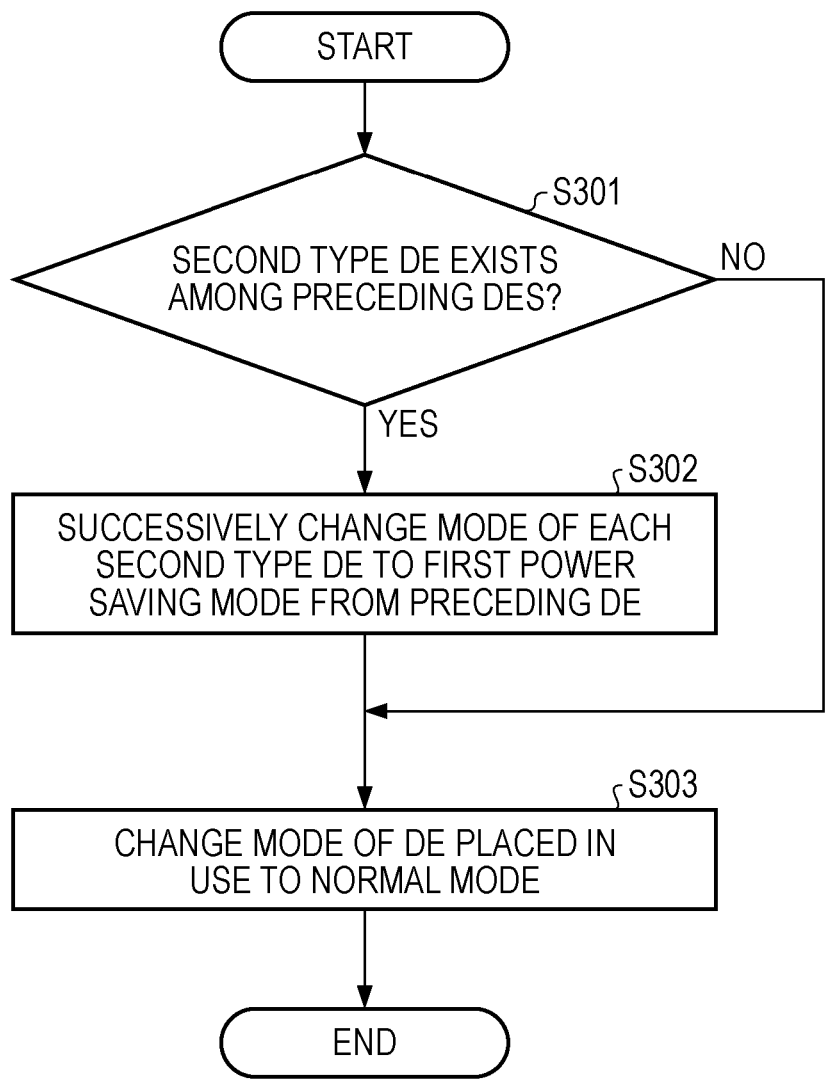
FIG. 6 is a flowchart illustrating a first mode control process performed by CM in the storage system according to the first embodiment.

When the registration for logical module and/or hot spare is made, CM 11 performs a first mode control process following the procedure illustrated in FIG. 6.

More specifically, after the registration for logical module etc. is made, CM 11 first determines whether or not one or more DEs 20 in the second power saving mode (referred to hereinafter as the second type DE) are present among the DEs preceding the DE 20 in which the registration for logical module etc. has been made (operation S301).

When one or more second type DEs are present among the preceding DEs (operation S301; YES), CM 11 changes the mode of each second type DE to the first power saving mode successively starting with the most preceding second type DE (operation S302). The process that CM 11 actually performs in operation S302 is a process in which CM 11 instructs the DE 20 preceding each second type DE to send COMWAKE to the next DE 20, successively starting with the most preceding second type DE.

After processing in operation S302, CM 11 changes the mode of the DE 20 that has become an in-use DE as a result of the registration as an element of the logical module etc. (referred to hereinafter as the target DE) to the normal mode (operation S303). If no second type DE is present among the preceding DEs (operation S301; NO), CM 11 performs processing in operation S303 without processing in operation S302.

In operation S303, CM 11 performs processing depending on the mode of the target DE. More specifically, if the target DE is in the first power saving mode, CM 11 performs processing to instruct the target DE to effect a transition to the normal mode. If the target DE is in the second power saving mode, CM 11 performs processing to instruct the DE 20 preceding the target DE to send COMWAKE to the next DE 20 (i.e., target DE).

After processing in operation S303, CM 11 completes the first mode control process.

Figure 7:
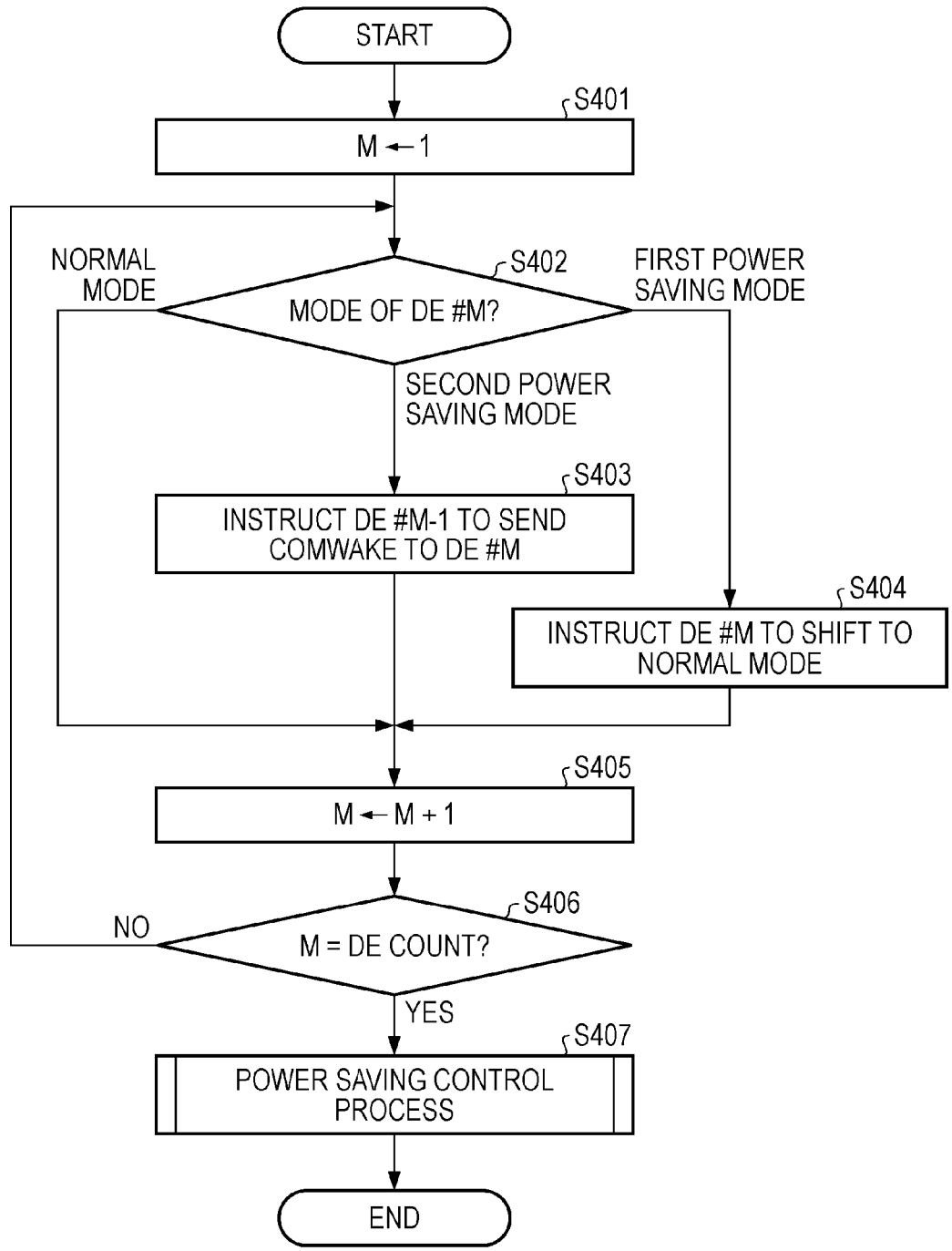
FIG. 7 is a flowchart illustrating a second mode control process performed by CM in the storage system according to the first embodiment.

When the registration for a logical module or hot spare is cancelled, CM 11 performs a second mode control process following the procedure illustrated in FIG. 7.

More specifically, upon initiating the second mode control process, CM 11 first sets a variable M to "1" (operation S401). Then, CM 11 determines whether DE #M is currently in the normal mode, first power saving mode, or second power saving mode (operation S402).

If DE #M is currently in the second power saving mode (operation S402; second power saving mode), CM 11 instructs DE #M−1 to send COMWAKE to DE #M (operation S403). When M=1, CM 11 sends COMWAKE to DE #1 in operation S403.

If DE #M is currently in the first power saving mode (operation S402; first power saving mode), CM 11 instructs DE #M to effect a transition to the normal mode (operation S404).

After processing in operation S403 or S404, CM 11 increments the M value by "1" (operation S405). If DE #M is currently in the normal mode (operation S402; normal mode), CM 11 increments the M value by "1" (operation S405) without processing in operation S403 or S404.

Subsequently, CM 11 determines whether or not the incremented M value matches the DE count (operation S406). If the M value does not match the DE count (operation S406; NO), CM 11 returns to operation S402 to repeat processing.

If the M value matches the DE count (operation S406; YES), CM 11 performs the power saving control process described above (FIG. 4) in operation S407 and then completes the second mode control process.

As described above, the storage system according to the present embodiment has the function of automatically controlling the transition of the DEs in which no disk 30 is used as an element of the logical module (or hot spare) to the second power saving mode in which power consumption is very low. For the DEs that are actually used, settings are made to allocate several disks 30 as the elements of the logical module, while for the extra DEs 20, settings for the logical module are not made. Accordingly, it may be said that the storage system according to the present embodiment automatically controls the power consumption of the extra storage units in the system.

Second Embodiment

Figure 8:
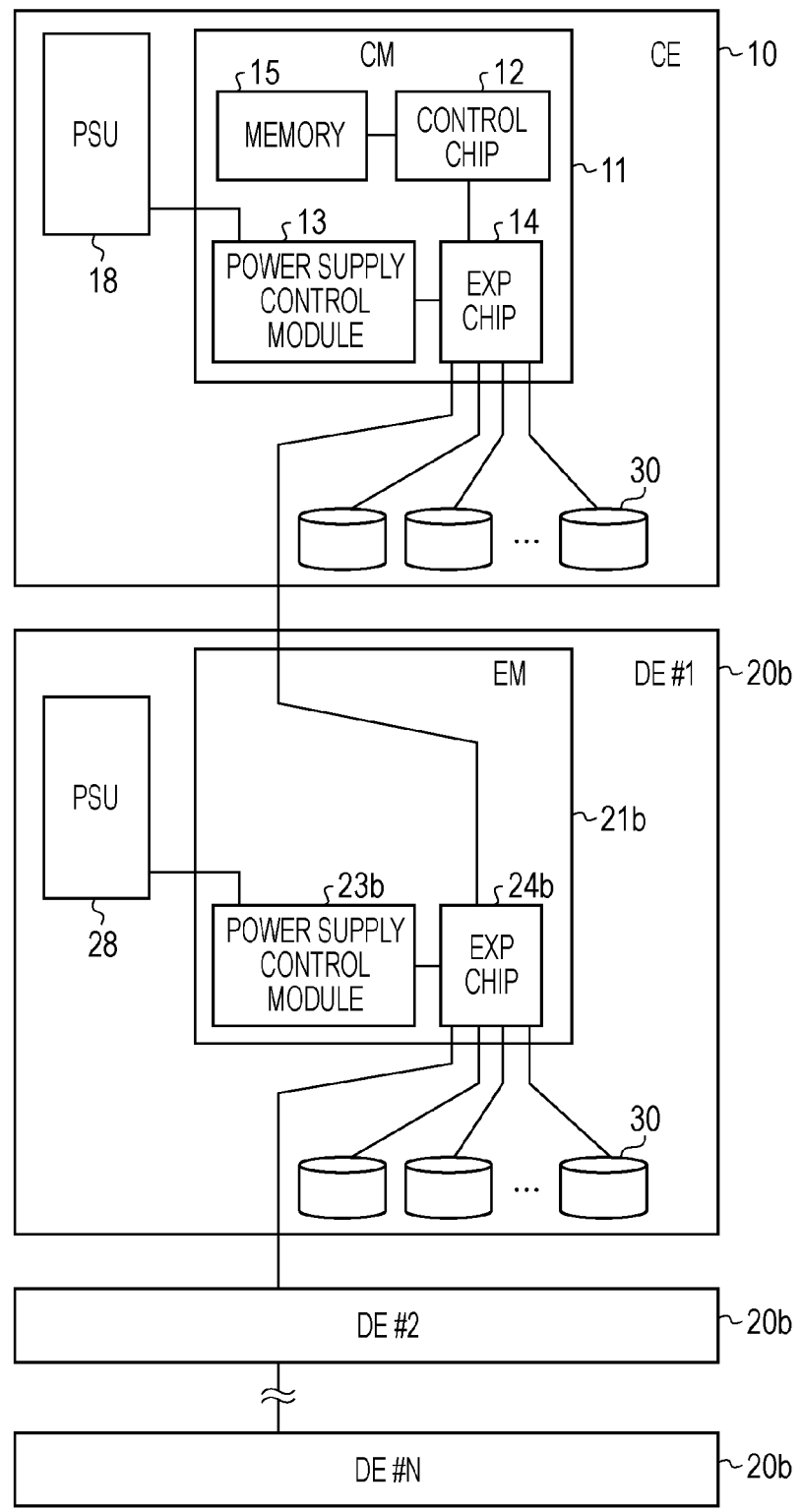
FIG. 8 is a schematic structural diagram of a storage system according to a second embodiment.

Referring now to FIG. 8, the configuration and operations of a storage system according to a second embodiment is described, focusing on differences from the storage system according to the first embodiment described above.

As illustrated in FIG. 8, the storage system according to the second embodiment includes a CE 10 and a plurality of DEs 20b.

The CE 10 in the storage system according to the second embodiment is the same as the CE 10 provided in the storage system according to the first embodiment. Each DE 20b in the storage system according to the second embodiment includes EM 21b, instead of the EM 21 provided in each DE 20 in the storage system according to the first embodiment.

A power supply control module 23b in EM 21b is a unit that has basically the same function as the power supply control module 23 provided in EM 21. The power supply control module 23b, however, receives a request for return to normal mode from an EXP chip 24b.

The EXP chip 24b in EM 21b is a unit that has functions of the repeater 25 and signal monitor 26 in addition to the function of the EXP chip 24. The EXP chip 24b enables electric power to be supplied separately to the portion that functions as the EXP chip 24 and to the portion that functions as the repeater 25 and signal monitor 26 (i.e., the unit is equipped with the so-called power gates).

The storage system according to the present embodiment is different from the storage system according to the first embodiment in that the EXP chip 24, repeater 25, and signal monitor 26 are implemented in a single chip. Accordingly, it may be said that the storage system according to the second embodiment automatically controls the power consumption of the extra storage units in the system.

Third Embodiment

Figure 9:
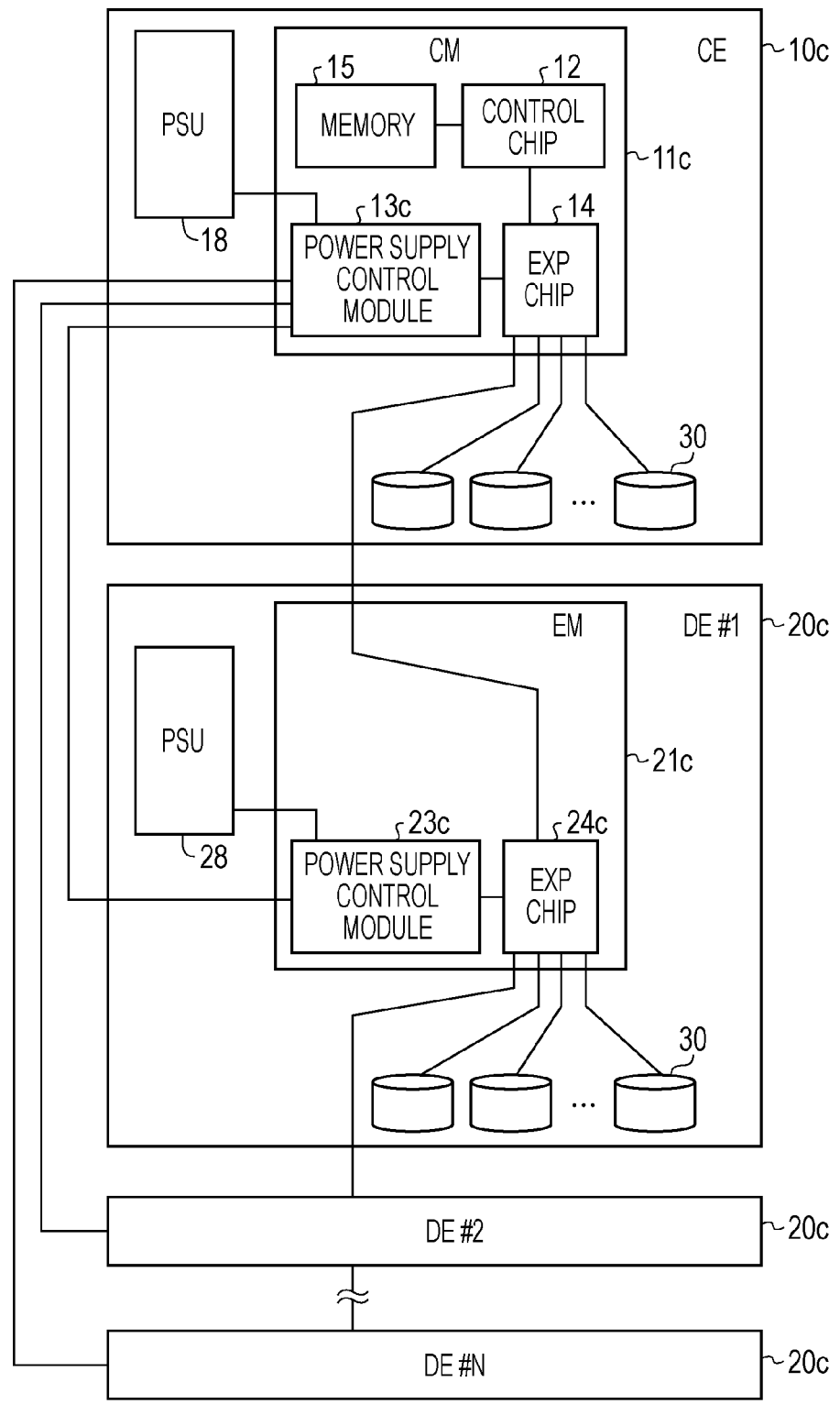
FIG. 9 is a schematic structural diagram of a storage system according to a third embodiment.

Referring now to FIG. 9, the configuration and operations of a storage system according to a third embodiment is described, focusing on differences from the storage system according to the first embodiment described above.

As illustrated in FIG. 9, the storage system according to the third embodiment includes CE 10c and a plurality of DEs 20c.

DE 20c is a device that includes an EM 21c instead of the EM 21 provided in DE 20. The EXP chip 24c in EM 21c is a SAS expander chip having no function for OOB sequence. The power supply control module 23c in EM 21c controls PSU 28 in response to instructions from the power supply control module 13c in CE 10c (instructions given via a dedicated hardware signal line in the present embodiment) to place DE 20c in one of the following three modes.
—Normal mode in which electric power is supplied to all the units in DE 20c; —first power saving mode in which electric power is supplied to the power supply control module 23c and EXP chip 24c in EM 21c but not to the disks 30, and the fan in PSU 28 is stopped; and —second power saving mode in which electric power is supplied to the power supply control module 23c but not to the EXP chip 24c and disks 30, and the fan in PSU 28 is stopped.

The power supply control module 23c is a unit that controls PSU 28 to place DE 20c in the second power saving mode upon start-up of the storage system.

CE 10c is a device that includes CM 11c instead of CM 11 provided in CE 10. The power supply control module 13c in CM 11c is a unit that sends the commands given by the control chip 12 via the EXP chip 14 to the power supply control module 23c in the DE 20c designated by the control chip 12.

The storage system according to the present embodiment is a system that is programmed such that the control chip 12 performs basically the same mode control operations as the control chip 12 provided in CM 11 by issuing commands to the power supply control module 23c in each DE 20c via the power supply control module 13c, etc.

Fourth Embodiment

The configuration and operations of a storage system according to a fourth embodiment is described, focusing on differences from the storage system according to the first embodiment described above.

Figure 10:
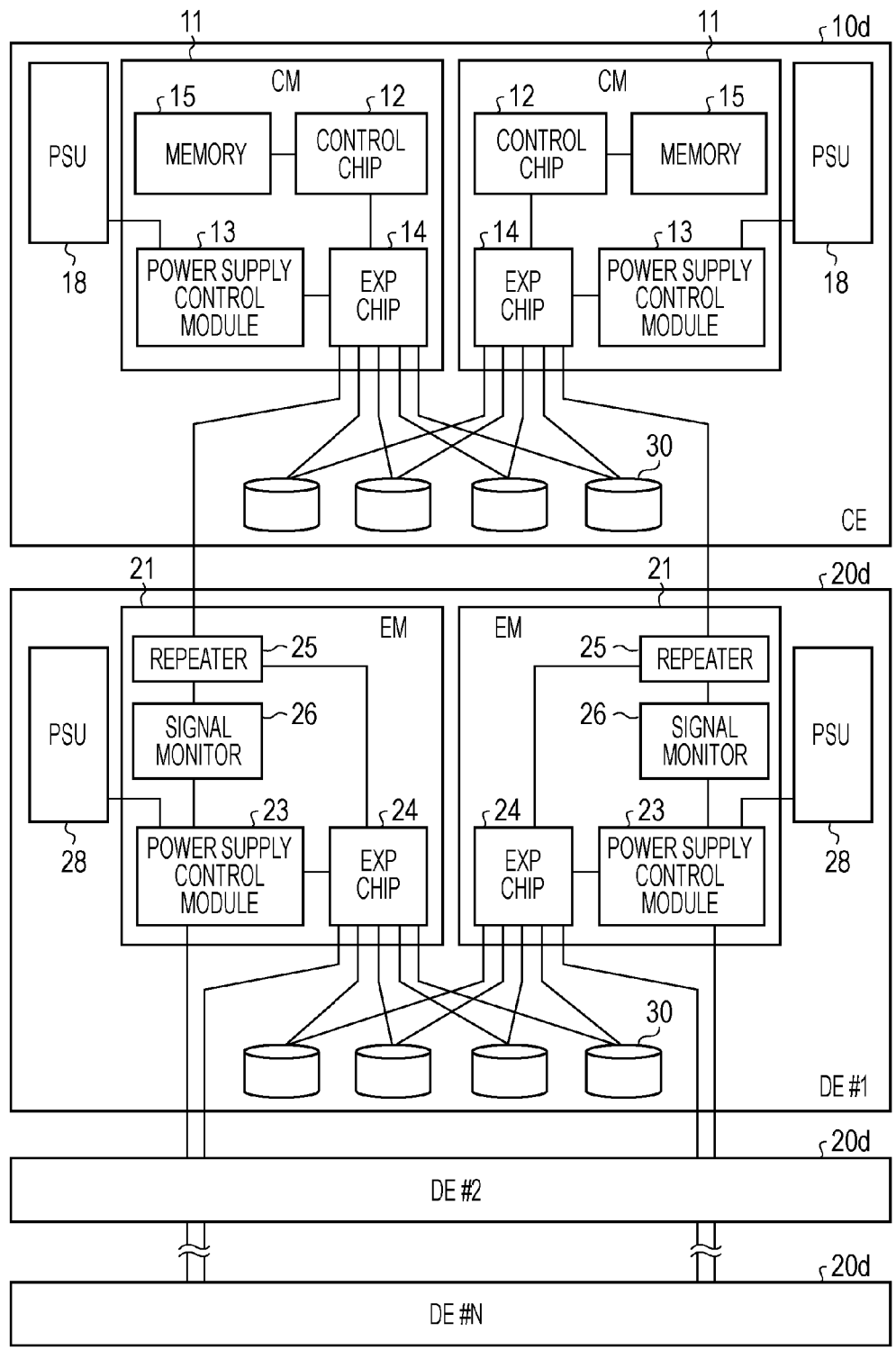
FIG. 10 is a schematic structural diagram of a storage system according to a fourth embodiment.

FIG. 10 schematically illustrates the structure of the storage system according to the fourth embodiment. As illustrated in FIG. 10, the storage system according to the present embodiment has a controller enclosure (CE) 10d that includes two power supply units (PSU) 18, two controller modules (CM) 11, and a plurality of disk drives 30. This storage system also has N drive enclosures (DE) 20d that each includes two PSUs 28, two expander modules (EM) 21, and a plurality of disk drives 30 (also referred to hereinafter as disks 30).

The units (PSU 18, repeater 25, etc.) in this storage system are basically the same as the units denoted by the same reference numerals in the storage system according to the first embodiment (FIG. 2). The units in pairs (CM 11, PSU 28, etc.) in each enclosure are arranged in redundant configuration. If one of the units in pairs (CM 11, PSU 28, etc.) fails in the storage system, the other unit takes over the processing (power supply to each unit, control of the disks 30, etc.) performed by the failed unit. Although not illustrated in FIG. 10, the power supply control module 13/23 in each CM 11/EM 21 is connected to both PSUs 18/28. To enable electric power to be supplied to the unit (CM 11/EM 21, etc.) to which electric power is not normally supplied, each PSU 18/28 is connected via a power supply line to the other units.

In the storage system according to the present embodiment, when the units are normally functioning, one control chip 12 determines the mode of each DE 20d and, on the basis of this determination, both control chips 12 control the power supply mode of the units in the EMs 21 connected thereto in each DE 20d.

As described above, the storage system according to each of the above embodiments has the function of automatically controlling the transition of the DEs in which no disk 30 is used as an element of the logical module (or hot spare) to the second power saving mode in which power consumption is very low. For the DEs that are actually used, settings are made to allocate several disks 30 as the elements of the logical module, while for the extra DEs, settings for the logical module are not made. Accordingly, it may be said that the storage system according to each embodiment described above automatically controls the power consumption of the extra storage units in the system.

Variations

Variations may be made to the storage system according to each embodiment described above. For example, the storage system according to each embodiment may be modified such that the power supplying mode is controlled in the units of several drives 30 in DE, instead of each DE. Furthermore, a storage system in which the enclosures are not differentiated as DE or CE may be implemented on the basis of the technology used in the storage system according to each embodiment.

It will be appreciated that the storage system according to each embodiment may be modified such that, although the same hardware configuration is used, specific processing procedures are different from the above, or the setting as a hot spare is impossible.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system that functions as one or more logical volumes, comprising:
   a control unit; and
   a plurality of storage units daisy-chained to the control unit;
   wherein the control unit includes
   a memory that stores information that indicates allocation status of the plurality of storage units to a logical volume,
   an access request responding unit that controls at least one storage unit among the plurality of storage units in response to a request for access to a logical volume from a host device, and
   a power saving controller that identifies an unused storage unit being unallocated to any logical volume among the plurality of storage units on the basis of the allocation status information, determines whether an in-use storage unit is subsequently connected to the identified unused storage unit and, based on the determination, performs power saving control on the identified unused storage unit.

2. The storage system according to claim 1,
   wherein each of the plurality of storage units includes
   one or more storage devices,
   a relay processor that relays information addressed to another unit received from a preceding unit directly connected to a current unit to a subsequent unit directly connected to the current unit and relays information from the subsequent unit to the preceding unit, and
   a power supply controller that stops power supply to the one or more storage devices in response to first instruction information and stops power supply to the one or more storage devices and the relay processor in response to second instruction information;
   wherein the memory in the control unit holds, as the allocation status information, the logical volume allocation status of each storage device in the plurality of storage units and information indicating the order of connection of the plurality of storage units;
   wherein the power saving controller in the control unit identifies, among the plurality of storage units, an unused storage unit in which no storage device is allocated to any logical volume, on the basis of the allocation status information, and sends the second instruction information to each unused storage unit to which the in-use storage unit is connected and sends the first instruction information to each unused storage unit to which the in-use storage unit is not connected.

3. The storage system according to claim 2,
   wherein the power supply controller in each storage unit, in response to third instruction information, starts supplying electric power to the units to which electric power supply is stopped;

wherein the power saving controller in the control unit, when the allocation status information is changed to information that indicates that at least one storage device in an unused storage unit is allocated to a logical volume, sends the third instruction information to the unused storage unit.

4. The storage system according to claim 2,
wherein the first and second instruction information is relayed by the relay processor in each storage unit;
wherein the power saving controller in the control unit sends the second instruction information to each unused storage unit to which the in-use storage unit is connected, in the descending order of the number of storage units that exist between the current storage unit and the unused storage unit and sends the first instruction information to each unused storage unit to which the in-use storage unit is not connected.

5. A method for power consumption control for a storage system that includes a control unit and a plurality of storage units daisy-chained to the control unit and functions as one or more logical volumes, the method comprising:

identifying, on the basis of logical volume allocation status of the plurality of storage units, an unused storage unit being unallocated to any logical volume among the plurality of storage units by the control unit;
determining whether an in-use storage unit is subsequently connected to the identified unused storage unit; and
based on the determining, performing power saving control on the identified unused storage unit by the control unit.

6. The storage system according to claim 3,
wherein the first and second instruction information is relayed by the relay processor in each storage unit;
wherein the power saving controller in the control unit sends the second instruction information to each unused storage unit to which the in-use storage unit is connected, in the descending order of the number of storage units that exist between the current storage unit and the unused storage unit and sends the first instruction information to each unused storage unit to which the in-use storage unit is not connected.

* * * * *